(12) United States Patent
Sitowitz et al.

(10) Patent No.: US 11,244,368 B1
(45) Date of Patent: Feb. 8, 2022

(54) ADAPTIVE CONTROL OF DOMAIN NAME REGISTRATIONS VIA DYNAMICALLY VARIABLE REGISTRATION REQUIREMENTS

(71) Applicant: VERISIGN, INC., Reston, VA (US)

(72) Inventors: Paul Sitowitz, South Riding, VA (US);
William Carroll, Sterling, VA (US);
Andrew Simpson, Sterling, VA (US);
Galileo Mark Namata, Alexandria, VA (US)

(73) Assignee: VERISIGN, INC., Reston, VA (US)

( * ) Notice: Subject to any disclaimer, the term of this patent is extended or adjusted under 35 U.S.C. 154(b) by 767 days.

(21) Appl. No.: 15/254,903

(22) Filed: Sep. 1, 2016

(51) Int. Cl.
*G06Q 30/00* (2012.01)
*G06Q 30/06* (2012.01)

(52) U.S. Cl.
CPC ................. *G06Q 30/0611* (2013.01)

(58) Field of Classification Search
CPC ............... G06Q 30/00; G06Q 30/0601; G06Q 30/0613; G06Q 30/0619; G06Q 30/08
See application file for complete search history.

(56) References Cited

U.S. PATENT DOCUMENTS

| | | | | |
|---|---|---|---|---|
| 2003/0225670 A1* | 12/2003 | DeCarlo, III | .......... | G06Q 30/08 705/37 |
| 2004/0199520 A1* | 10/2004 | Ruiz | .................. | H04L 29/12594 |
| 2009/0031028 A1* | 1/2009 | Kumar | ................ | H04L 63/0272 709/227 |
| 2011/0178865 A1* | 7/2011 | Ravichandran | ..... | H04L 29/0809 705/14.42 |
| 2011/0307432 A1* | 12/2011 | Yao | ........................ | G06F 16/951 706/25 |
| 2012/0158747 A1* | 6/2012 | Satow | ................... | G06F 16/951 707/748 |

(Continued)

OTHER PUBLICATIONS

Giordano, Maurizio. "DNS-Based discovery system in service oriented programming." European Grid Conference. Springer, Berlin, Heidelberg, 2005. (Year: 2005).*

*Primary Examiner* — Christopher B Seibert
(74) *Attorney, Agent, or Firm* — MH2 Technology Law Group, LLP

(57) ABSTRACT

Systems and methods for dynamically establishing and adjusting domain name registration requirements to adaptively control registration activities being performed in response to domain name registration requests include a registration controller communicatively coupled to a registry server that maintains a domain name registry. The registry server receives a request to register a requested domain name, and the registration controller tokenizes the requested domain name into a set of domain tokens including one or more substrings of the requested domain name, estimates a demand for the requested domain name based on the set of domain tokens, establishes registration requirements for completing a registration of the requested domain name based on the estimated demand for the requested domain name, obtains a first feedback indicating that the requested domain name is not registered at the one or more registration requirements, and adjusts the one or more registration requirements in response to the first feedback to provide one or more adjusted registration requirements.

16 Claims, 5 Drawing Sheets

(56) References Cited

U.S. PATENT DOCUMENTS

2013/0173701 A1* 7/2013 Goyal .................. H04L 61/302
                                                    709/204
2014/0188872 A1* 7/2014 Bushlack ............. H04L 61/302
                                                    707/736
2016/0196346 A1* 7/2016 Kamdar ............. G06F 16/9535
                                                    705/26.1

* cited by examiner

ADAPTIVE CONTROL OF DOMAIN NAME REGISTRATIONS VIA DYNAMICALLY VARIABLE REGISTRATION REQUIREMENTS

FIELD

This present disclosure relates generally to adaptively controlling domain name registrations by dynamically establishing and adjusting domain name registration requirements.

BACKGROUND

The Domain Name System ("DNS") is a hierarchical naming system for computers, services, or any resource participating in the Internet. In general, the DNS is the part of the Internet infrastructure that translates human-readable domain names into the Internet Protocol ("IP") numbers needed to establish Transmission Control Protocol ("TCP")/IP communication over the Internet. That is, DNS allows users to refer to web sites, and other resources, using domain names that are easier to remember, such as "www.example.com", rather than the numeric IP addresses, such as "123.4.56.78", assigned to computers on the Internet. Using the DNS, it is possible to associate various information with domain names assigned to Internet participants. An analogy has been made that the DNS serves as the "phone book" for the Internet by translating human-friendly computer hostnames into IP addresses.

Domain name registration is conducted under a Shared Registration System ("SRS"), which was created by NETWORK SOLUTIONS, INC. in 1999 to provide a registry through which multiple, globally diverse registrars could register domain names. The term "registry" refers to the entity responsible for managing allocation of domain names within a particular name space, such as a top level domain ("TLD"). The responsibility for operating a TLD, such as maintaining databases of second and/or lower-level domains within the TLD, is delegated to a particular DNS registry. The DNS registry is responsible for mapping domain names to IP addresses and resolving domain names through DNS servers that maintain such information in large databases, and operating one or more TLDs assigned to the DNS registry. VERISIGN, INC. is currently the largest DNS registry in the world, managing over 100 million digital identities associated with ".com" and ".net" TLDs.

A registrar is an entity having the authority to add names to the registry. Thus, entities such as registrants that wish to register a domain name do so through a registrar, which in turn registers the desired domain name with the appropriate registry. Many registrars exist and provide users with the ability to register a domain name in many different TLDs. The overall registration system, including the multiple registries, is overseen by the Internet Corporation for Assigned Names and Numbers ("ICANN").

Domain names are registered for a predetermined period. At the expiration of the predetermined period, the domain name will enter a redemption period in which the domain name's owner can renew the domain name for an additional period. Many domain names, particularly of companies, are renewed in order to maintain continuity of ownership. However, if the registrant does not renew the domain name during the redemption period, then the domain name enters the PENDINGDELETE period and will be purged from the registry database after five calendar days. Domain names that are not renewed may be referred to as expiring domain names.

A number of different companies provide lists of domain names that are expiring and enable a registrant to purchase these expiring domain names. Some websites provide search tools to enable a potential registrant to find expiring domain names with particular characteristics. Once found, the domain names are available for purchase at stated prices or through auctions.

SUMMARY

Implementations of the present disclosure relate to systems, methods, and articles of manufacture for adaptively controlling registration activities being performed in response to requests to register domain names by obtaining relevant assessments of the domain names and substrings therein, dynamically establishing registration requirements for the domain names based on the relevant assessments, tracking feedback responsive to the registration requirements, and dynamically adjusting the registration requirements based on relevant feedback.

Implementations of the present disclosure relate to systems and methods for dynamically establishing and adjusting domain name registration requirements to adaptively control domain name registration activities include a registration controller communicatively coupled to a registry server that maintains a domain name registry. The registry server receives a request from a requesting entity to register a requested domain name, and the registration controller tokenizes the requested domain name into a set of domain tokens including one or more substrings of the requested domain name, estimates a demand for the requested domain name based on the set of domain tokens, and establishes registration requirements for completing a registration of the requested domain name based on the estimated demand for the requested domain name and/or the requesting entity's characteristics. Registration requirements include an offer price at which the requested domain name is offered for registration, a time period specifying when the offer price is valid, one or more TLDs for which the offer price applies, a whitelist of one or more entities eligible to register the domain name at the offer price, a blacklist of one or more entities ineligible to register the domain name at the offer price, and the like. Registration requirements can also include entity eligibility requirements applicable to the requesting entity, examples of which include an accreditation requirement, an authentication requirement, a domain name ownership requirement, and the like. The registration controller then obtains a first feedback indicating that the requested domain name is not registered at the one or more registration requirements, and adjusts the one or more registration requirements in response to the first feedback to provide one or more adjusted registration requirements.

It is to be understood that both the foregoing general description and the following detailed description are exemplary and explanatory only and are not restrictive of the implementations, as claimed.

BRIEF DESCRIPTION OF THE DRAWINGS

The accompanying drawings, which are incorporated in and constitute a part of this specification, illustrate implementations of the invention and together with the description, serve to explain the principles of the present disclosure.

In the drawings.

DETAILED DESCRIPTION

Reference will now be made in detail to examples of implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

The following general definitions will he used herein. Resolve: to translate or convert one or more domain names to one or more IP addresses. Resolver: a computer (or computers) issuing a DNS query in order to resolve a domain name. Name server: a computer (or computers) receiving DNS queries and answering the DNS queries directly or via resolvers against other name servers. Subnet: a group of IP addresses sharing octets of the IP address.

As new TLDs have been introduced into the domain name ecosystem, requirements for uniform pricing in generic TLDs ("gTLDs") have been relaxed and registry operators are allowed to establish variable pricing models. Identifying appropriate registration requirements for domain names, such as the domain names' offer price, is typically a demand-based exercise. Most registry operators study historical values of strings to establish a fixed set of strings that, if contained in a domain name, would warrant premium pricing for the domain name. Such registry operators typically analyze the length, rarity, and meaning of strings contained in the domain names to determine which of the domain names command premium pricing. More analytical approaches may be based upon past premium market values, but existing implementations are fairly static in nature and do not adapt to ever-evolving market values for certain strings or string combinations.

Figure 1:
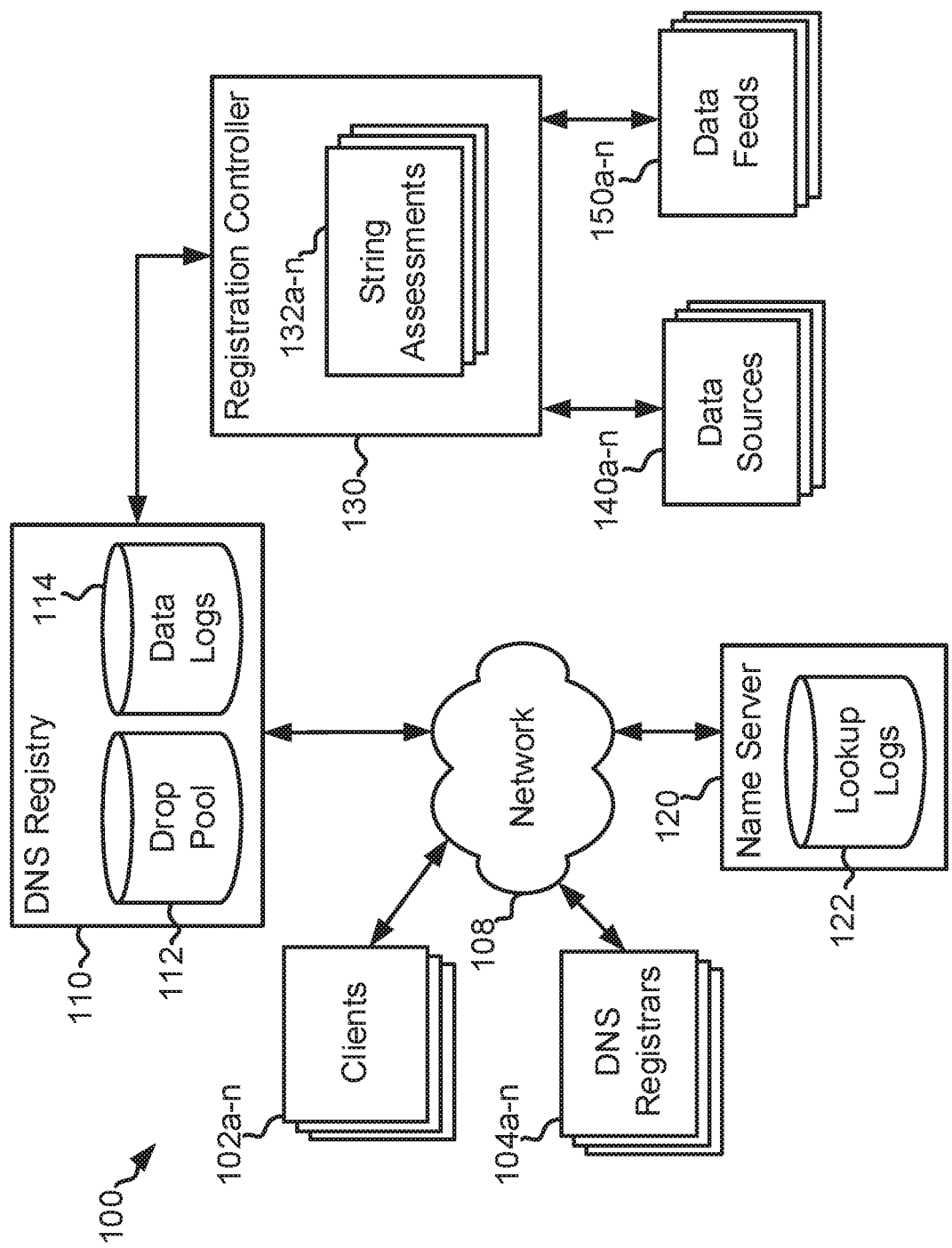
FIG. 1 is a block diagram of an example of a system that dynamically establishes and adjusts domain name registration requirements to adaptively control domain name registration activities, consistent with implementations of the present disclosure.

By way of a non-limiting example, FIG. 1 illustrates a system 100 that adaptively controls registration activities being performed in response to domain name registration requests, consistent with the principles of the present disclosure. To adaptively control the registration activities, system 100 obtains relevant assessments associated with the domain names and substrings therein, dynamically establishes the domain names' registration requirements based on the relevant assessments, obtains feedback responsive to the registration requirements, and dynamically adjusts the registration requirements based on relevant feedback. Components and entities in system 100 can be implemented through hardware, software, and/or firmware. The arrangement and number of components and entities in system 100 is not limited to what is shown. Other variations in the arrangement and number of components and entities are possible, consistent with implementations of the present disclosure. System 100 includes entities, examples of which include clients 102*a-n* and DNS registrars 104*a-n*, that are communicatively coupled via at least one network 108 to at least one DNS registry 110, which can receive and process domain name registration requests originated by the entities in system 100.

Clients 102*a-n* can provide user interfaces for users to interact with DNS registrars 104*a-n* and DNS registry 110. Users can include individuals, organizations, drop-catch service providers, and the like. One of ordinary skill in the art would understand that clients 102*a-n* can send domain name registration requests to DNS registrars 104*a-n* or directly to DNS registry 110. By way of example, clients 102*a-n* can be implemented using any device capable of accessing a data network, such as a personal computer equipped with a modem or other network interface. Clients 102*a-n* can also be implemented in other devices, such as a mobile device with data access functions (e.g., a smartphone), a personal digital assistant with a network connection, an IP telephony device, or generally any device capable of communicating over a data network. Clients 102*a-n* can be associated with one or more webservers that host a website to which a domain name resolves. In addition, clients 102*a-n* can be associated with a conventional server that can, for example, host a website, perform name server transactions, perform domain name provisioning services, perform domain name resolution services, communicate with other servers over network 108, etc.

DNS registrars 104*a-n* can include one or more machines or processors, and can exchange domain name-related information with clients 102*a-n* and DNS registry 110. Domain name-related information can include, for example, at least one domain name and its registration status, registration date/time, expiration date/time, registrant/owner, TLD, one or more associated name servers, one or more associated IP addresses, and the like. DNS registrars 104*a-n* can also submit commands to DNS registry 110, including create, update, transfer, renew, and delete, to perform desired operations on domain names. DNS registry 110 can receive and process commands submitted by DNS registrars 104*a-n* to provide or manage domain name-related information in response to the commands. DNS registrars 104*a-n* and DNS registry 110 can communicate, for example, via the Extensible Provisioning Protocol ("EPP"). The default transport for EPP is TCP, but DNS registry 110 can be configured to receive and transmit EPP messages over Hypertext Transfer Protocol ("HTTP"), HTTP Secure ("HTTPS"), or other network protocols.

Network 108 provides communication channels between or among the various components and entities depicted in system 100. Network 108 can be a shared, public, or private network or a hybrid thereof, and can encompass a wide area or local area. Network 108 can be implemented through any suitable combination of wired and/or wireless communication networks. Examples of wireless communication networks include Wi-Fi networks, global system for mobile communications/general packet radio services networks, time division multiple access networks, code division multiple access networks, cloud-based networks, Bluetooth networks, near-field communication networks, and the like. By way of example, network 108 can be implemented through a wide area network, local area network, a private network (e.g., an intranet), a public network (e.g., the Internet), or a combination thereof. Further, the components and entities of system 100 can be connected to multiple networks, such as, for example, to a wireless carrier network, a private data network, and the public Internet.

DNS registry 110 can include one or more machines or processors, and can be responsible for operating one or more TLDs and maintaining a registry of second-level domains within the TLDs. DNS registry 110 is primarily responsible for answering queries to resolve IP addresses associated with domain names, typically through DNS servers that maintain such information in large databases. DNS registry 110 can maintain a drop pool 112 of expired domain names that are scheduled to be dropped (e.g., delete pending) from DNS registry 110. Expired domain names can remain in drop pool 112 for a drop period, typically between 30 and 80 days after their expiration, prior to being deleted from DNS registry 110 and made available for the entities in system 100 to register. DNS registry 110 maintains one or more data logs 114 for storing DNS-related information, such as domain names specified in registration or resolution requests received by DNS registry 110. For example, subsequent to receiving a request from one of the entities in system 100 to register a domain name, DNS registry 110 can store the requesting entity's identifier, a timestamp indicating when the registration request was made or received, a domain name sought to be registered, etc., in data logs 114. For another example, subsequent to receiving a lookup query from one of the entities to resolve a domain name, DNS registry 110 can store the querying entity's identifier, a timestamp indicating when the lookup query was made or received, a domain name being looked up, whether the domain name resolved to a valid IP address or was deemed to be a non-existent domain ("NXD"), etc., in data logs 114.

System 100 also includes at least one name server 120 that can receive and answer lookup queries from the entities in system 100 via network 108. Name server 120 can forward lookup queries that cannot be answered by name server 120 to other name servers (not shown) or the root name server in DNS registry 110. Name server 120 includes one or more lookup logs 122 that store information associated with the lookup queries. For example, subsequent to receiving a lookup query from one of the entities in system 100, name server 120 can store, in lookup logs 122, the querying entity's identifier, a timestamp indicating when the lookup query was made or received, a domain name sought to be resolved, whether the domain name resolved to a valid IP address or was deemed to be an NXD, and the like.

Figure 2:
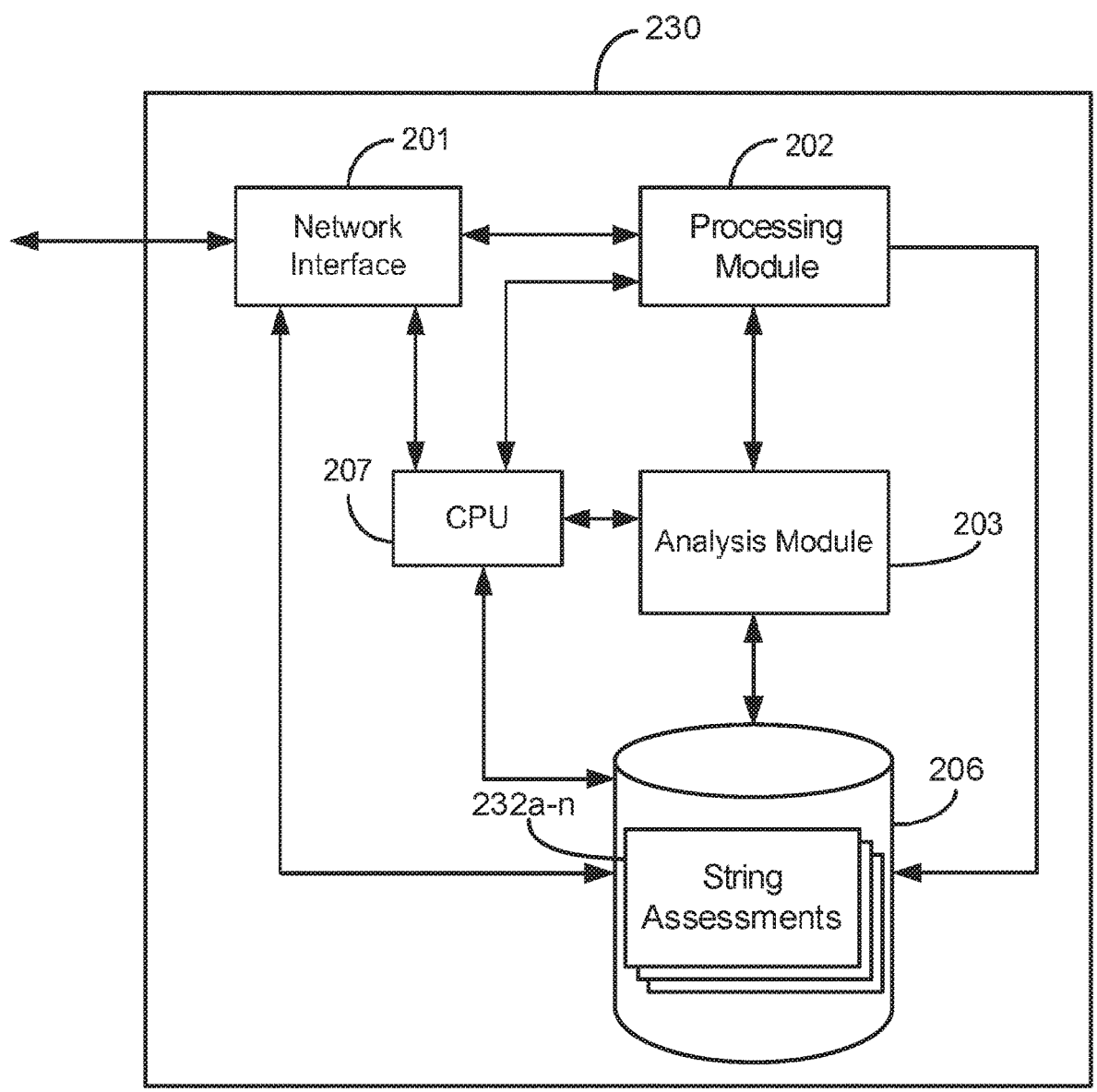
FIG. 2 is a block diagram illustrating an example of a registration controller that adaptively controls domain name registration activities by dynamically establishing and adjusting domain name registration requirements, consistent with implementations of the present disclosure.
Figure 3:
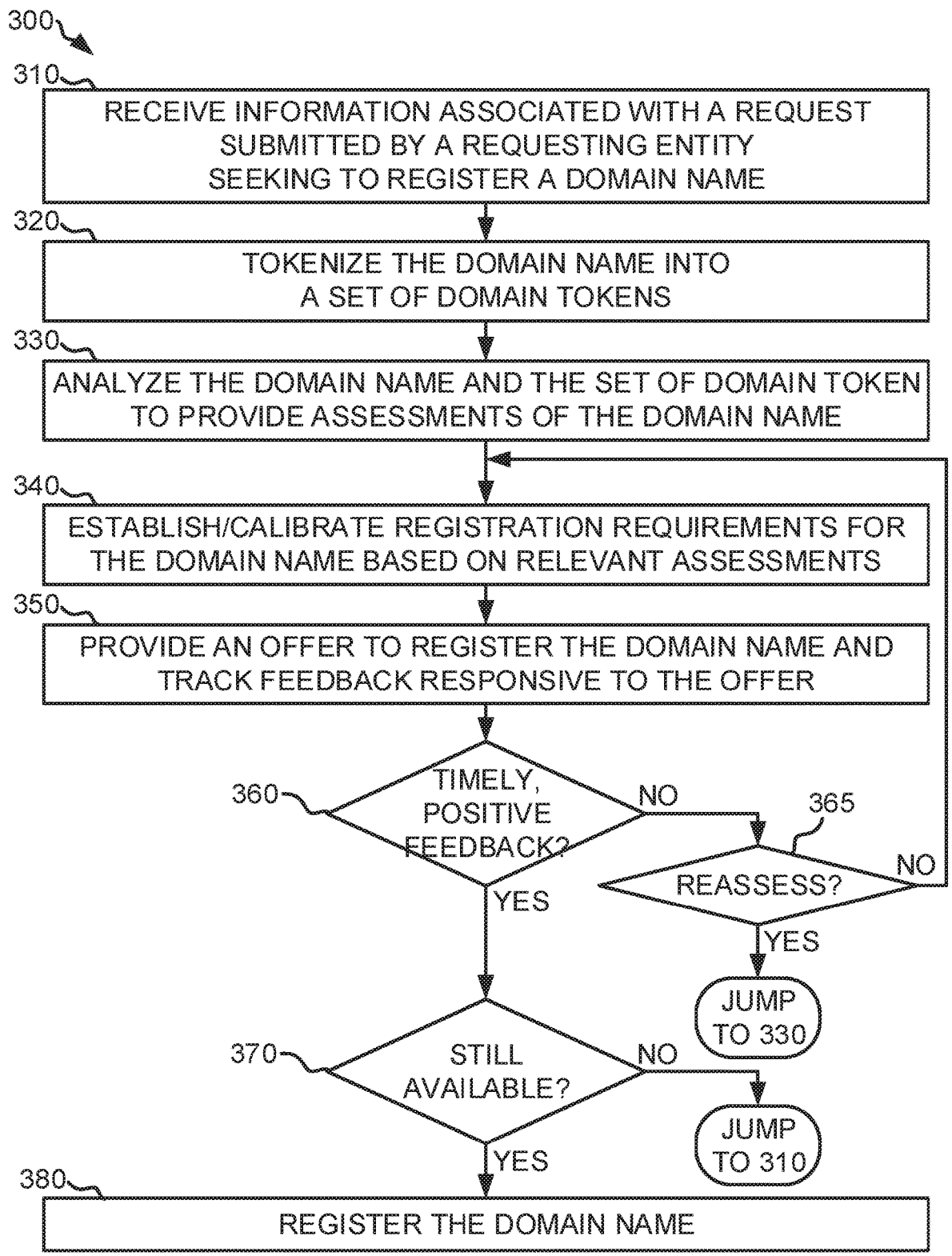
FIG. 3 is a flow diagram of an example of a process performed by the registration controller for dynamically establishing and adjusting domain name registration requirements to adaptively control domain name registration activities, consistent with implementations of the present disclosure.

In various implementations, and as described in greater detail infra and with respect to FIGS. 2 and 3, system 100 includes at least one registration controller 130, which can operate as an independent entity that is communicatively coupled to DNS registry 110. Alternatively or in addition, DNS registry 110 can provide and operate registration controller 130 as a part of DNS registry 110. Registration controller 130 adaptively controls registration activities being performed in response to requests to register domain names by dynamically establishing and adjusting variable registration requirements for registering the domain names. Registration controller 130 can dynamically establish, for each domain name, one or more variable registration requirements, example of which include at least one offer price at which the domain name is offered for registration, at least one time period specifying when the offer price is valid, at least one TLD for which the offer price applies, a whitelist of one or more entities eligible to register the domain name at the offer price (e.g., entities that have never been a registrant of the domain name), a blacklist of one or more entities ineligible to register the domain name at the offer price (e.g., the domain name's current/recent registrant), and the like. Registration requirements can also include eligibility requirements for the requesting entity, such as an accreditation requirement (e.g., the requesting entity must be a specific type of organization to register the requested domain name), an authentication requirement (e.g., the requesting entity must provide proof of identity), a domain name ownership requirement (e.g., the requesting entity must prove ownership of another domain name related to the requested domain name), and the like. An example of an accreditation requirement for a domain name likely to be used for charitable or non-profit purposes (e.g., "RedCross.tld") can require that the requesting entity be a registered $501(c)$ organization. An example of an authentication requirement can require authentication of the requesting entity's stated individual or organization identity via proof of the stated identity, such as pertinent documentation, identity certificates, passwords, etc. An example of a domain name ownership requirement can require the requesting entity to provide proof of ownership of "example.tld" when the requesting entity attempts to register "wwwexample.tld" or other commonly-mistyped domain names.

The entities in system 100 can send domain name registration requests (e.g., EPP create commands) to DNS registry 110 seeking to register at least one domain name and become the domain name's registrant. However, to successfully register the domain name, a registering entity must satisfy (e.g., agree to, fulfill, etc.) variable registration requirements established by registration controller 130 for the domain name. The entities can also send domain name information requests (e.g., EPP info commands) to query DNS registry 110 and/or registration controller 130 for the domain name's established registration requirements, such as an offer price at which each querying entity can register the domain name, a time period during which the offer price is valid, a TLD for which the offer price applies, etc.

In various implementations, registration controller 130 dynamically establishes and adjusts variable registration requirements for domain names. More particularly, registration controller 130 can tokenize a domain name into one or more constituent strings, analyze the domain name and the constituent strings to obtain relevant assessments associated with the constituent strings, dynamically establish the domain name's registration requirements based on the relevant assessments, track feedback responsive to the domain name's registration requirements, and adaptively calibrate the domain name's registration requirements based on relevant feedback. For example, in response to a request to register a domain name, registration controller 130 can tokenize the domain name into one or more constituent strings, and based on a determination that the domain name's constituent strings exhibit favorable assessments (e.g., they are associated with high and/or spiking levels of interest or demand), registration controller 130 can dynamically establish elevated registration requirements (e.g., a premium offer price) for the domain name.

Constituent strings of a domain name include one or more substrings of the domain name and can also include one or more combinations of the substrings. For instance, constituent strings of an example domain name "MyFirstCreditOrDebitCard.com" include substrings such as "My," "First," "Credit," "Or," "Debit," "Card," "DebitCard," and "CreditOrDebit," as well as substring combinations such as "Credit Card" and "My First Card."

To obtain assessments relevant to the domain name's constituent strings, registration controller 130 provides and maintains one or more string assessments 132a-n for cataloging string sets and assessments associated with the string sets. A string set contains either a string or a combination of multiple strings. For example, a string set can contain either "hurricane" or a combination of "Hurricane" and "Katrina." For logographic languages (e.g., Chinese, Japanese kanji, Korean hanja), a string set contains either a logogram or a combination of logograms. Registration controller 130 provides assessments of each string set based on, for example, properties of strings contained in the string set, a level of demand or interest for strings contained in the string set, and the like. String properties can include the length, meaning, rarity, common usage, grammatical properties, etc., of at least one string in the string set. Level of demand or interest for the strings can include a frequency of requests to register or resolve domain names containing at least one string in the string set, a change in frequency of requests to register or resolve domain names containing at least one string in the string set, the registration history of domain names containing at least one string in the string set, trending topics or search terms containing at least one string in the string set, etc.

Figure 4:
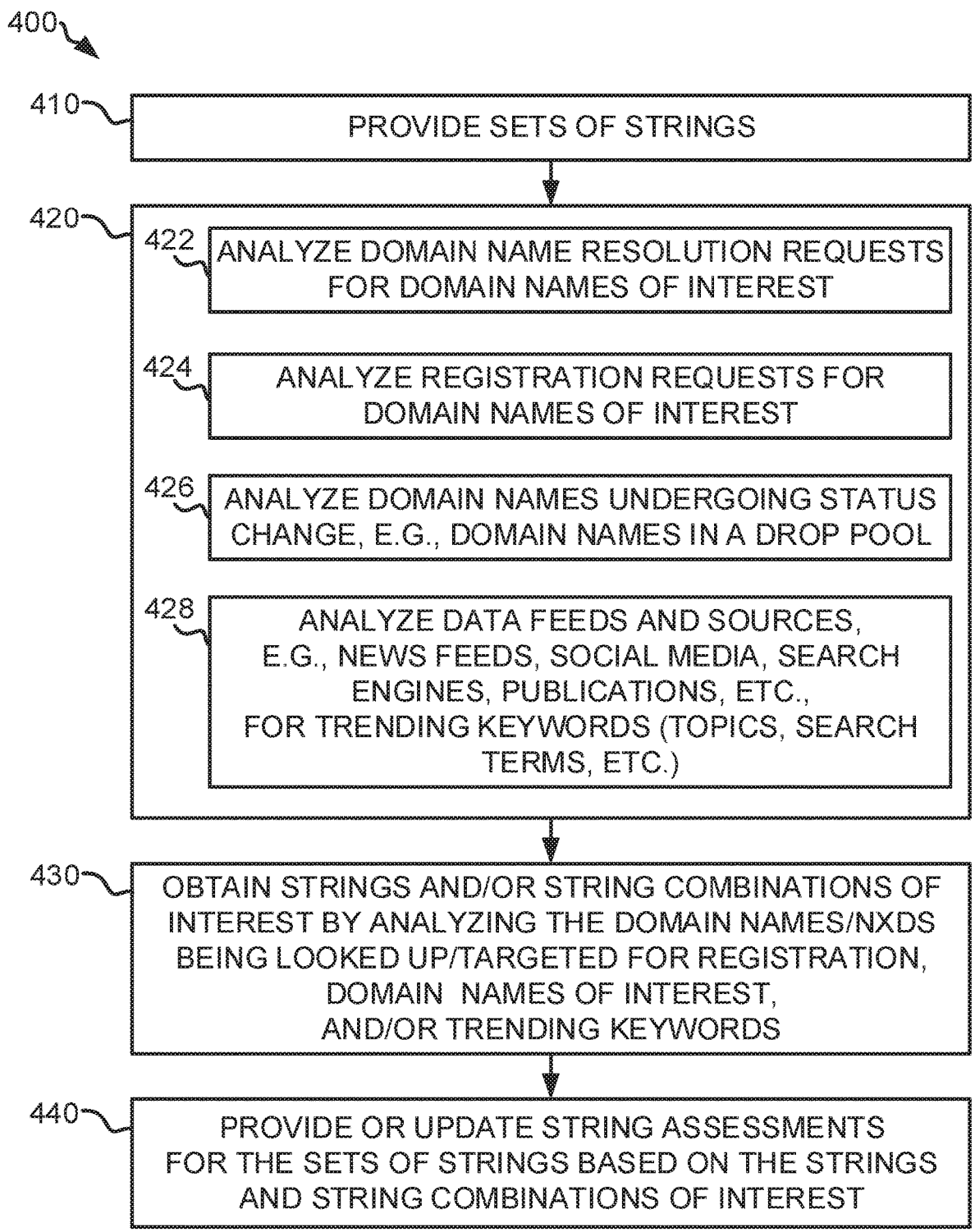
FIG. 4 is a flow diagram of an example of a process performed by the registration controller to provide and update string assessments for sets of strings, consistent with implementations of the present disclosure.

As described in greater detail infra with respect to FIGS. 2 and 4, registration controller 130 can provide assessments of strings and string sets in string assessments 132a-n based on information obtained from DNS registry 110, name server 120, data sources 140a-n, and/or data feeds 150a-n. Registration controller 130 can obtain, from data logs 114 and/or lookup logs 122, information pertaining to domain name registration or resolution requests to gauge a level of demand or interest for particular strings in domain names. Registration controller 130 can query data sources 140a-n to obtain properties of particular strings (e.g., from one or more dictionaries), determine a level of demand or interest for particular strings (e.g., from one or more search engines or social media), and the like. Registration controller 130 can parse and aggregate data streams from data feeds 150a-n (e.g., one or more news feeds) to identify trending topics and keywords.

In various implementations, DNS registrars 104a-n can serve as drop registrars that attempt to register (e.g., drop-catch) one or more of the expired domain names in drop pool 112, and can do so on behalf of clients 102a-n or other entities, such as DNS registrars 104a-n themselves. For instance, one or more drop registrars of DNS registrars 104a-n can target the expired domain names for registration, either in response to one or more registration requests from a requesting client or on the drop registrars' own initiative. The drop registrars can attempt to acquire the targeted domain names, for example, by submitting one or more domain name registration requests to DNS registry 110. The domain name registration requests specify the targeted domain names, and can be submitted as EPP create commands. The domain name registration requests can specify one or more of the expired domain names that the drop registrars are targeting for registration, and each registration request can identify a respective drop registrar that submitted the registration request and at least one targeted domain name that the respective drop registrar is attempting to register. DNS registry 110 can receive and parse the registration requests for information related to the registration requests, such as the drop registrars that submitted the registration requests, the expired domain names targeted by the drop registrars via the registration requests, timestamps associated with the registration requests, and the like. Registration request-related information can also include, for example, the identity of the releasing registrars from which the targeted domain names are being released, timestamps associated with the targeted domain names' expiry or change in ownership, etc.

DNS registrars 104a-n can ascertain the targeted domain names' availability for registration, for example, by checking domain name-related records stored locally at the drop registrars and/or querying DNS registry 110. If the targeted domain names are available for the drop registrars to register, then the drop registrars can register the targeted domain names, for example, by satisfying registration requirements that registration controller 130 established for the targeted domain names. Registration information related to a registered domain name can include a registrant, a registration timestamp indicating when the registrant registered the domain name, an expiry indicating when the registration will expire, the registration's duration and continuity, a number of times that the domain name's ownership has changed, a registrar where additional registration information is available, and the like. One of ordinary skill in the art would understand that DNS registrars 104a-n and/or DNS registry 110 can store and provide registered domain names' registration information.

By way of a non-limiting example, FIG. 2 illustrates a registration controller 230 (e.g., registration controller 130 as shown in FIG. 1) that dynamically establishes and adjusts domain name registration requirements to adaptively control domain name registrations in a networked system (e.g., system 100), consistent with the principles of the present disclosure. To dynamically establish and adjust registration requirements for a domain name, registration controller 230 tokenizes the domain name into one or more constituent strings, analyzes the domain name and the constituent strings to obtain relevant assessments, dynamically establishes the domain name's registration requirements based on the relevant assessments, tracks feedback responsive to the domain name's registration requirements, and adaptively calibrates the domain name's registration requirements based on relevant feedback. For example, registration controller 230 can dynamically establish elevated registration requirements (e.g., a premium or higher-than-average offer price) for domain names containing one or more constituent strings deemed by registration controller 230 to exhibit favorable assessments (e.g., associated with high and/or spiking levels of interest or demand). Components and entities in registration controller 230 can be implemented through hardware, software, and/or firmware. The arrangement and number of components and entities in registration controller 230 are not limited to what is shown. Other variations in the arrangement and number of components and entities are possible, consistent with implementations of the present disclosure.

Registration controller 230 provides an automated way for establishing and adjusting offer prices and other requirements for registering available domain names. In doing so, registration controller 230 enables a DNS registry (e.g., DNS registry 110) to maximize value from available strings for domain names by adapting dynamically and promptly to actual demand without human intervention, which is a significant improvement over existing conventional practices that rely on fixed lists of strings that are updated very infrequently and in a labor-intensive way. Under conventional practices, the DNS registry fails to keep up with constantly-evolving market demands, and the DNS registry misses many opportunities for premium sales that can generate a significant portion of all new TLD revenues.

Dynamically establishing and adjusting registration requirements (e.g., raising the offer price, setting entity eligibility requirements, etc.) for domain names with constituent strings exhibiting certain assessments (e.g., have high or spiking DNS lookup rates) also provides the benefit of protecting vulnerable end-users from malicious middlemen seeking to exploit public confusion. For example, if a domain name has either recently expired or is in high demand because of recent media attention, malicious middlemen can register the domain name at a below-market price to confuse unwitting end users over legitimate websites by causing the domain name to resolve to a phishing website (e.g., fake donation websites for natural disasters). Because most malicious middlemen are highly price-sensitive, registration controller 230 can keep such malicious middlemen from cheaply registering the domain name for exploitative purposes, for example, by recognizing the domain name's high or spiking DNS traffic and dynamically increasing the domain name's offer price, entity eligibility requirements, and/or other registration requirements accordingly.

In various implementations, an example of which is shown in FIG. 2, registration controller 230 can include interconnected components such as a network interface module ("NIM") 201, a processing module 202, an analysis module 203, a storage 206, a central processing unit ("CPU") 207, etc. NIM 201 can be configured to communicate with external systems and networks using any one of the conventional wired or wireless mediums. NIM 201 can provide network interfaces accessible by the DNS registry or other entities in the networked system via at least one network (e.g., network 108). In addition, NIM 201 can obtain DNS-related information from the DNS registry, at least one name server (e.g., name server 120), or other entities over any protocol in the IP suite, such as, for example, TCP/IP, HTTP, HTTPS, etc. In some embodiments, NIM 201 may be a computer program, subprogram, or set of instructions that are executed by the registration controller (e.g. by a CPU 207) and may include specialized communications hardware.

Registration controller 230 utilizes processing module 202 to provide and maintain one or more string assessments 232*a-n* (e.g., string assessments 132*a-n*) that store and catalog string sets and assessments associated with the string sets. In some embodiments, processing module 202 may be a computer program, subprogram, or set of instructions that are executed by the registration controller (e.g. by a CPU 207). Assessments associated with each string set include, for example, the properties of strings in the string set, the level of demand or interest for strings in the string set, and the like. Processing module 202 can query one or more DNS servers (e.g., DNS registry 110, name server 120, etc.), one or more data sources (e.g., data sources 140*a-n*), one or more data feeds (e.g., data feeds 150*a-n*), etc., to obtain and catalog assessments associated with string sets in string assessments 232*a-n*. Examples of data sources include dictionaries, search engines, social media, and the like. Examples of data feeds include news feeds, and the like. To gauge a level of domain name-related demand or interest for at least one particular string, processing module 202 can query the DNS servers for information associated with requests to register or resolve domain names containing the particular string. To obtain and define the properties of at least one particular string, processing module 202 can query dictionaries for the particular string's properties. To gauge a level of demand or interest for at least one particular string, processing module 202 can query search engines or parse social media. And, to identify trending topics and keywords, processing module 202 can parse and aggregate data streams from news feeds.

Registration controller 230 utilizes analysis module 203 to adaptively control domain name registration activities by dynamically establishing and adjusting variable registration requirements. In some embodiments, analysis module 203 may be a computer program, subprogram, or set of instructions that are executed by the registration controller (e.g. by a CPU 207). Analysis module 203 can dynamically establish, for each domain name, one or more variable registration requirements, such as an offer price at which the domain name is offered for registration, a time period specifying when the offer price is valid, a TLD for which the offer price applies, a whitelist of one or more entities eligible to register the domain name at the offer price, a blacklist of one or more entities ineligible to register the domain name at the offer price, which entities are eligible to register the domain name (e.g., an entity eligibility requirement such as an accreditation requirement, an authentication requirement, a domain name ownership requirement, etc.), and the like. To do so, analysis module 203 tokenizes a domain name into one or more constituent strings, analyzes the domain name and the constituent strings to obtain relevant assessments associated with the constituent strings from string assessments 232*a-n*, dynamically establishes the domain name's registration requirements based on the relevant assessments, tracks feedback responsive to the domain name's registration requirements, and adaptively calibrates the domain name's registration requirements based on relevant feedback. For example, in response to a request to register a domain name, analysis module 203 can tokenize the domain name into one or more constituent strings, and based on a determination that the domain name's constituent strings exhibit favorable assessments (e.g., the strings are associated with high and/or spiking levels of interest or demand), analysis module 203 can dynamically establish elevated registration requirements (e.g., a premium offer price) for the domain name.

Storage 206 can be implemented using any non-transitory computer storage medium, such as disks, flash memory, and the like. Storage 206 can store string assessments 232*a-n*, and can also store other information like event logs and program instructions for processing and analyzing incoming information to dynamically establish and adjust variable domain name registration requirements. CPU 207, which can be implemented as one or more integrated circuits (e.g., a conventional microprocessor or microcontroller), can control the operation of registration controller 230. CPU 207 can retrieve one or more program instructions stored in storage 206 and execute the one or more programs to implement, instruct, and/or cause processing module 202 and/or analysis module 203 to perform certain functions and operations.

Further, while registration controller 230 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of devices including electronic devices implemented using any combination of circuitry and software.

FIG. 3 is a flow diagram of an example of a process 300 performed by, e.g., a registration controller (e.g., registration controller 130 or 230) for dynamically establishing and adjusting domain name registration requirements to adaptively control domain name registration activities, consistent with implementations of the present disclosure. A domain name registry (e.g., DNS registry 110) can initiate process 300 in response to receiving a request to register a domain name. At stage 310, the registration controller receives information associated with the request, such as the domain name, a requesting entity seeking to register the domain name, etc. Next, at stage 320, the registration controller tokenizes the domain name into a set of domain tokens, and then at stage 330, the registration controller analyzes the domain name and the set of domain tokens to provide an assessment of the domain name. For example, the registration controller can look up string assessments (e.g., string assessments 132a-n or 232a-n) associated with the set of domain tokens to provide the domain name's assessment.

At stage 340, the registration controller establishes, based on the domain name's assessment, one or more registration requirements, examples of which include an offer price, an offer period of time for which the offer is valid, a whitelist of entities eligible for the offer price, a blacklist of entities ineligible for the offer price, an entity eligibility requirement (e.g., an accreditation requirement, an identification requirement, a related domain name ownership requirement), and the like.

Next, at stage 350, the registration controller can provide a registration offer for the requesting entity to register the domain name and track any feedback responsive to the registration offer. The registration controller can provide the registration offer, for example, by providing the domain name's registration requirements for the requesting entity to accept/satisfy or reject. Depending on the nature of each registration requirement, the requesting entity can accept or satisfy the registration requirement. For instance, if the registration requirement is an offer price, then the requesting entity can accept by signaling acceptance of the offer price or the registration offer as a whole, e.g., by selecting a pertinent checkbox, clicking on a pertinent "accept" button, entering a pertinent alphanumeric string, and the like. For another instance, if the registration requirement is a 501(c) accreditation requirement for registering a domain name likely to be used for charitable or non-profit purposes, then the requesting entity can satisfy the registration requirement by providing proof of the required accreditation, signing a statement attesting to the required accreditation, and the like.

Then, at stage 360, the registration controller can determine whether or not timely, positive feedback is received during the offer period by tracking and processing any feedback to the registration offer or determining that the offer period has expired. Examples of positive feedback include an acceptance of the registration offer, acceptance or satisfaction of all registration requirements relevant to the registration offer, completion of the registration request, etc.

If, at stage 360, the registration controller determines that feedback received is not positive, for example, the requesting entity cancels the registration request, rejects the registration offer, fails to accept or satisfy all relevant registration requirements during the offer period, then process 300 can proceed to stage 365. At stage 365, the registration controller can determine whether or not to reassess the domain name, for example, by evaluating whether or not the domain name's current assessments and/or registration requirements remain valid (e.g., not yet expired based on associated time-to-live). If, at stage 365, the registration controller elects to not reassess the domain name, then process 300 can jump to stage 340, at which the registration controller can calibrate or adjust the domain name's registration requirements to account for any relevant feedback or lack thereof, if warranted, or simply maintain the domain name's registration requirements. For example, subsequent to determining that the domain name failed to receive positive feedback within the domain name's offer period, the registration controller can calibrate or adjust the domain name's registration requirements by lowering the domain name's offer price, extending the offer period, adding one or more TLDs for which the offer price applies, adding entities to the whitelist of entities eligible for the offer price, removing entities from the blacklist of entities ineligible for the offer price, lowering or removing entity eligibility requirements, and the like. However, if at stage 365 the registration controller elects to reassess the domain name, for example, because the domain name's current assessments and/or registration requirements are no longer valid (e.g., expired based on the registration requirements' associated time-to-live), then process 300 can jump to stage 330 to reassess the domain name.

Alternatively, if at stage 360 the feedback is determined to be timely and positive, for example, the requesting entity accepts and/or satisfies the registration requirements prior to the expiration of the offer period, then process 300 proceeds to stage 370 to continue processing of the registration request. At stage 370, the registration controller can determine whether or not the domain name remains available for the requesting entity to register, for example, by querying the domain name registry.

If, at stage 370, the domain name is determined to be no longer available for the requesting entity to register at the registration requirements, e.g., another entity has registered the domain name or the registration requirements are no longer valid, then the registration controller can indicate a failure of the registration request and/or provide information associated with the failure to the requesting entity, and process 300 can jump to stage 310.

Alternatively, if at stage 370 the domain name is determined to still be available for the requesting entity to register at the registration requirements, e.g., the domain name remains unregistered and the registration requirements remain valid, then process 300 proceeds to stage 380. At stage 380, the registration controller registers the domain name for the requesting entity and records the registration and/or the registration requirements agreed to by the requesting entity. Finally, process 300 ends or returns to stage 310.

FIG. 4 is a flow diagram of an example of a process 400 performed by, e.g., a registration controller (e.g., registration controller 130 or 230) to provide and maintain string assessments (e.g., string assessments 132a-n or 232a-n), consistent with implementations of the present disclosure. The registration controller can initiate process 400 upon instantiation or anytime thereafter to provide and update the string assessments, which store and catalog string sets and assessments associated with the string sets. At stage 410, the registration controller can provide the string sets, each of which contains a string or a combination of strings. Next, at stage 420, the registration controller can assess the string sets to provide and keep the string assessments current, for example, by updating the string assessments frequently on a periodic basis (e.g., every month, week, day, hour, half hour, etc.) or in a real-time, event-driven basis. Stage 420 can include multiple stages 422-428 that can be performed concurrently or sequentially. At stage 422, the registration controller can analyze resolution requests seeking to resolve domain names of interest, including NXDs, received by a DNS registry (e.g., DNS registry 110) or at least one name server (e.g., name server 120). At stage 424, the registration controller can analyze registration requests seeking to register domain names of interest received by the DNS registry. At stage 426, the registration controller can analyze domain names that will undergo, are undergoing, or have recently undergone status change, such as domain names in the DNS registry's drop pool (e.g., drop pool 112). At stage 428, the registration controller can analyze data sources and feeds (e.g., data sources 140a-n and data feeds 150a-n) for trending keywords (e.g., topics, search terms, etc.) that are observed to have high levels of interest or demand and/or spiking levels of interest or demand.

Next, at stage 430, the registration controller obtains strings and string combinations of interest, for example, by analyzing the domain names of interest and trending keywords. Then, at stage 440, the registration controller provides or updates the string assessments based on the strings and string combinations of interest. The registration controller can continue to perform process 400 to update the string assessments periodically or in a real-time basis.

It will be appreciated that processes 300 and 400 described herein are illustrative and that variations and modifications are possible. Acts described as sequential can be executed in parallel, order of acts can be varied, and acts can be modified or combined. While the disclosure has been described with respect to specific implementations, those skilled in the art will recognize that numerous modifications are possible. For instance, the registration controller and the networked system can have additional functionalities not mentioned herein. In addition, implementations of the present disclosure can be realized using any combination of dedicated components and/or programmable processors and/or other programmable devices. While the implementations described above can make reference to specific hardware and software components, those skilled in the art will appreciate that different combinations of hardware and/or software components can also be used and that particular operations described as being implemented in hardware might also be implemented in software or vice versa.

Figure 5:
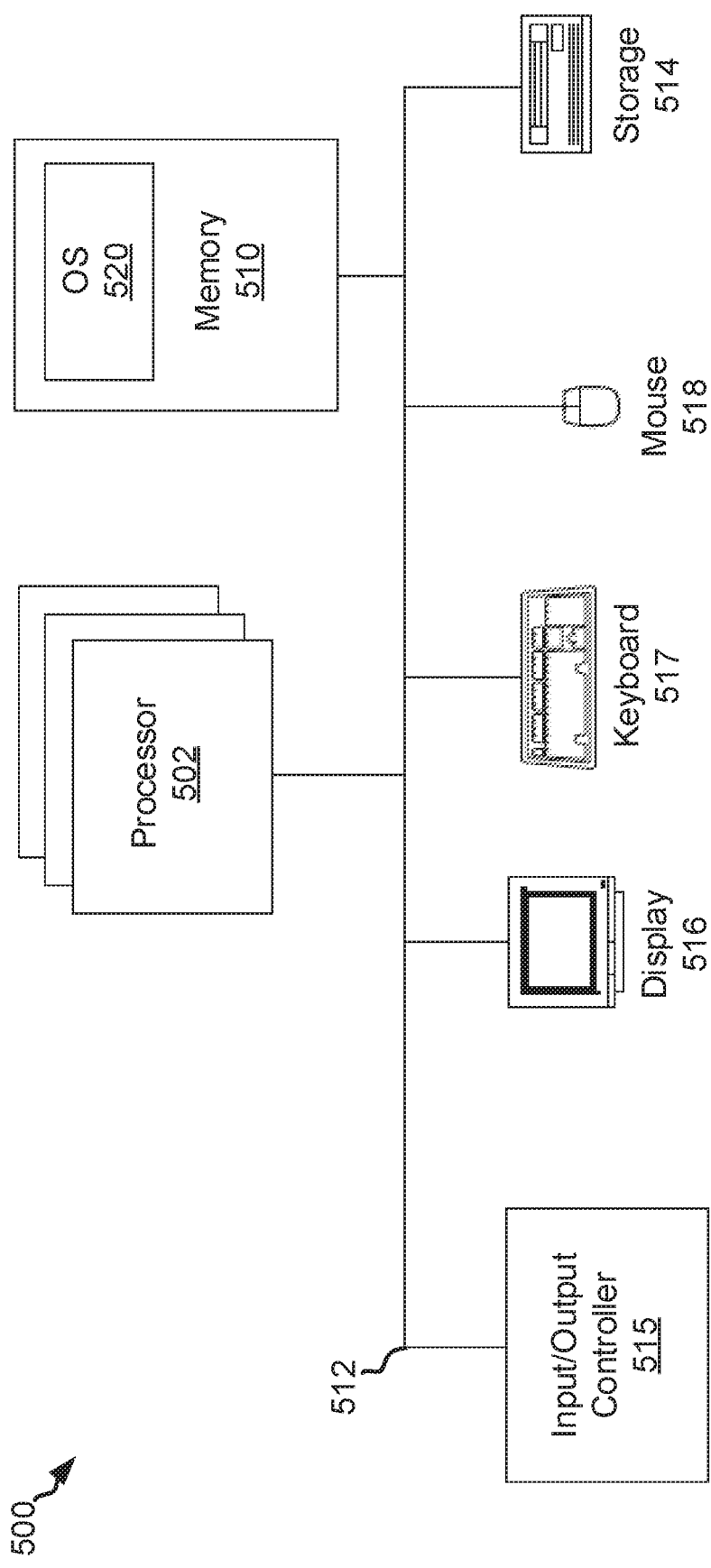
FIG. 5 is an example of a computer system for performing the disclosed implementations, consistent with the present disclosure.

FIG. 5 illustrates an example of a computer system 500 that is consistent with implementations of the present disclosure. In general, implementations of a domain name registration controller (e.g., registration controller 130) in a networked system (e.g., system 100) may be implemented in various computer systems, such as a mobile device, a personal computer, a server, a workstation, an embedded system, a communication device, or a combination thereof. Certain implementations of the registration controller may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer-readable medium, which include storage devices and signals, in compressed or uncompressed form. However, for purposes of explanation, system 500 is shown as a general purpose computer that is well known to those skilled in the art. Examples of the components that may be included in system 500 will now be described.

As shown, system 500 may include at least one processor 502, a keyboard 517, a pointing device 518 (e.g., a mouse, a touchpad, and the like), a display 516, main memory 510, an input/output controller 515, and a storage device 514. Storage device 514 can comprise, for example, RAM, ROM, flash memory, EEPROM, CD-ROM or other optical disk storage, magnetic disk storage or other magnetic storage devices, or any other non-transitory medium that can be used to carry or store desired program code in the form of instructions or data structures and that can be accessed by a computer. A copy of the computer program implementation of the registration controller can be stored on, for example, storage device 514. System 500 may also be provided with additional input/output devices, such as a printer (not shown). The various components of system 500 communicate through a system bus 512 or similar architecture. In addition, system 500 may include an operating system (OS) 520 that resides in memory 510 during operation. One skilled in the art will recognize that system 500 may include multiple processors 502. For example, system 500 may include multiple copies of the same processor. Alternatively, system 500 may include a heterogeneous mix of various types of processors. For example, system 500 may use one processor as a primary processor and other processors as co-processors. For another example, system 500 may include one or more multi-core processors and one or more single core processors. Thus, system 500 may include any number of execution cores across a set of processors (e.g., processor 502). As to keyboard 517, pointing device 518, and display 516, these components may be implemented using components that are well known to those skilled in the art. One skilled in the art will also recognize that other components and peripherals may be included in system 500.

Main memory 510 serves as a primary storage area of system 500 and holds data that is actively used by applications, such as the registration controller in the herein-described systems, running on processor 502. One skilled in the art will recognize that applications are software programs that each contains a set of computer instructions for instructing system 500 to perform a set of specific tasks or operations during runtime, and that the term "applications" may be used interchangeably with application software, application programs, device drivers, and/or programs in accordance with implementations of the present teachings. Memory 510 may be implemented as a random access memory or other forms of memory as described below, which are well known to those skilled in the art.

OS 520 is an integrated collection of routines and instructions that are responsible for the direct control and management of the hardware in system 500 and system operations. Additionally, OS 520 provides a foundation upon which to run application software and device drivers. For example, OS 520 may perform services, such as resource allocation, scheduling, input/output control, and memory management. OS 520 may be predominantly software, but may also contain partial or complete hardware implementations and firmware. Well known examples of operating systems that are consistent with the principles of the present teachings include MICROSOFT WINDOWS, MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor (e.g., processor 402), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the processes, functions, operations, and stages described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one implementation be plural or distributed, and resources described as multiple or distributed can in implementations be combined. The scope of the present teachings is accordingly intended to be limited only by the following claims. Although the invention has been described with respect to specific implementations, it will be appreciated that the invention is intended to cover all modifications and equivalents within the scope of the following claims.

What is claimed is:

1. A system for dynamically setting variable requirements for registering a domain name, the system comprising:
    a registry server configured to receive, over a computer network, a request related to registration of a requested domain name, wherein the registry server is configured to maintain a registry, wherein the registry is configured to maintain information pertaining to domain name registration or resolution; and
    a registration controller communicatively coupled to the registry server, wherein the registration controller includes a network interface module that provides network communication between the registry server over the computer network and to one or more databases, a processor, and non-transitory memory storing instructions that, when executed by the processor, cause the registration controller to perform operations comprising:
        estimating a demand for the requested domain name based on the one or more domain tokens of the requested domain name and the information pertaining to domain name registration or resolution by querying the one or more databases for information pertaining to properties of particular strings, a level of demand or interest to register or resolve a domain name containing a particular string, or both the properties of particular strings and the level of demand or interest to register or resolve a domain name containing a particular string, wherein the one or more domain tokens of the requested domain name comprises one or more substrings of the requested domain name; and
        obtaining a first feedback that indicates, based on one or more registration requirements for completing a registration of the requested domain name, the requested domain name is not registerable,
        wherein the one or more registration requirements are based on the estimated demand for the requested domain name,
        wherein the one or more registration requirements are adjusted in response to the first feedback to provide one or more adjusted registration requirements,
        wherein the one or more adjusted registration requirements comprises at least one or more of: at least one entity removed from a list of ineligible entities that are prevented from registering the requested domain name, a lowered offer price of the requested domain name, an extended an offer period, one or more added top level domains for which the offer price applies, one or more entities added to a list of entities eligible for the offer price, or a lowered or removed entity eligibility requirement, wherein the at least one entity and the one or more entities are subject to the one or more registration requirements for registering the requested domain name.

2. The system of claim 1, wherein the operations further comprise:
obtaining lookup information associated with a plurality of lookup requests to resolve one or more domain names;
processing the lookup information to provide a lookup frequency of at least one domain token in the one or more domain tokens in the plurality of lookup requests; and
adjusting the estimated demand for the requested domain name based on the lookup frequency.

3. The system of claim 1, wherein operations further comprise:
obtaining non-existent domain (NXD) lookup information associated with a plurality of lookup requests to resolve one or more NXDs;
processing the NXD lookup information to provide a lookup frequency of at least one domain token in the one or more domain tokens in the plurality of lookup requests; and
adjusting the estimated demand for the requested domain name based on the lookup frequency.

4. The system of claim 1, wherein the operations further comprise:
obtaining registration information associated with a plurality of registration requests to register one or more domain names;
processing the registration information to provide a registration frequency of at least one domain token in the one or more domain tokens in the plurality of registration requests; and
adjusting the estimated demand for the requested domain name based on the registration frequency.

5. The system of claim 1, wherein the operations further comprise:
obtaining one or more trending keywords; and
adjusting the estimated demand for the requested domain name based on the one or more trending keywords.

6. The system of claim 1, wherein the operations further comprise:
obtaining domain names of interest associated with a plurality of expiring domain names; and
adjusting the estimated demand for the requested domain name based on the domain names of interest.

7. The system of claim 1, wherein the operations further comprise:
determining that the requested domain name is not registerable within a time-to-live for the offer price; and
providing the first feedback indicating that the requested domain name is not registerable by the requesting entity based on the one or more registration requirements.

8. The system of claim 1, wherein the operations further comprise:
obtaining a second feedback indicating that the requested domain name is registerable based on the one or more adjusted registration requirements; and
registering the requested domain name.

9. A method, implemented by a processor, of dynamically setting variable requirements for registering a domain name, the method comprising:
receiving, by a registry server over a computer network, a request to register a requested domain name over the computer network, wherein the registry server is configured to maintain a registry, wherein the registry is configured to maintain information pertaining to domain name registration or resolution;
estimating a demand for the requested domain name based on one or more domain tokens and on information pertaining to domain name registration or resolution, wherein the one or more domain tokens comprise one or more substrings of the requested domain name; and
obtaining a first feedback that indicates the requested domain name is not registerable based on one or more registration requirements for completing a registration of the requested domain name,
wherein the one or more registration requirements are based on the estimated demand for the requested domain name by querying the one or more databases for information pertaining to properties of particular strings, a level of demand or interest to register or resolve a domain name containing a particular string, or both the properties of particular strings and the level of demand or interest to register or resolve a domain name containing a particular string,
wherein the one or more registration requirements are adjusted in response to the first feedback to provide one or more adjusted registration requirements,
wherein the one or more adjusted registration requirements comprises at least one of at least one entity removed from a list of ineligible entities that are prevented from registering the requested domain name, a lowered offer price of the requested domain name, an extended offer period, one or more added top level domains for which the offer price applies, one or more entities added to a list of entities eligible for the offer price, or lowered or removed entity eligibility requirement,
wherein the at least one entity and the one or more entities are subject to the one or more registration requirements for registering the requested domain name.

10. The method of claim 9, further comprising:
obtaining lookup information associated with a plurality of lookup requests to resolve one or more domain names;
processing the lookup information to provide a lookup frequency of at least one domain token in the one or more domain tokens in the plurality of lookup requests; and
adjusting the estimated demand for the requested domain name based on the lookup frequency.

11. The method of claim 9, further comprising:
obtaining non-existent domain (NXD) lookup information associated with a plurality of lookup requests to resolve one or more NXDs;
processing the NXD lookup information to provide a lookup frequency of at least one domain token in the one or more domain tokens in the plurality of lookup requests; and
adjusting the estimated demand for the requested domain name based on the lookup frequency.

12. The method of claim 9, further comprising:
obtaining registration information associated with a plurality of registration requests to register one or more domain names;
processing the registration information to provide a registration frequency of at least one domain token in the one or more domain tokens in the plurality of registration requests; and
adjusting the estimated demand for the requested domain name based on the registration frequency.

13. The method of claim 9, further comprising:
obtaining one or more trending keywords; and
adjusting the estimated demand for the requested domain name based on the one or more trending keywords.

14. The method of claim 9, further comprising:
obtaining domain names of interest associated with a plurality of expiring domain names; and
adjusting the estimated demand for the requested domain name based on the domain names of interest.

15. The method of claim 9, further comprising:
determining that the requested domain name is not registerable within a time-to-live for the offer price; and
providing the first feedback indicating that the requested domain name is not registerable by the requesting entity based on the one or more registration requirements.

16. A non-transitory computer-readable storage medium including instructions that, when executed by a processor of a registry server that is communicatively coupled to a computer network, causes the processor to execute a method for dynamically setting variable requirements for registering domain names, the method comprising:
receiving a request to register a requested domain name over the computer network, wherein the registry server is configured to maintain a registry, wherein the registry is configured to maintain information pertaining to domain name registration or resolution;
estimating a demand for the requested domain name based on a set of domain tokens and the information pertaining to domain name registration or resolution by querying the one or more databases for information pertaining to properties of particular strings, a level of demand or interest to register or resolve a domain name containing a particular string, or both the properties of particular strings and the level of demand or interest to register or resolve a domain name containing a particular string, wherein the set of domain tokens one or more substrings of the requested domain name; and
obtaining a first feedback that indicates the requested domain name is not registerable based on one or more registration requirements for completing a registration of the requested domain name, wherein the one or more registration requirements are based on the estimated demand for the requested domain name,
wherein the one or more registration requirements are adjusted in response to the first feedback to provide one or more adjusted registration requirements, wherein the one or more adjusted registration requirements comprises at least one of at least one entity removed from a list of ineligible entities that are prevented from registering the requested domain name, a lowered offer price of the requested domain name, an extended offer period, one or more added top level domains for which the offer price applies, one or more entities added to a list of entities eligible for the offer price, or a lowered or removed entity eligibility requirement, wherein the at least one entity and the one or more entities are subject to the one or more registration requirements for registering the requested domain name.

\* \* \* \* \*